United States Patent
Moutton

(10) Patent No.: US 9,832,927 B2
(45) Date of Patent: Dec. 5, 2017

(54) SENSOR ARRANGEMENT FOR COMBINE HARVESTER

(71) Applicant: CNH Industrial America LLC, New Holland, PA (US)

(72) Inventor: Bart Moutton, Gits (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/313,427

(22) PCT Filed: May 26, 2015

(86) PCT No.: PCT/EP2015/061549
§ 371 (c)(1),
(2) Date: Nov. 22, 2016

(87) PCT Pub. No.: WO2015/181143
PCT Pub. Date: Dec. 3, 2015

(65) Prior Publication Data
US 2017/0150680 A1 Jun. 1, 2017

(30) Foreign Application Priority Data
May 26, 2014 (BE) .............................. BE2014/0402

(51) Int. Cl.
*A01D 41/127* (2006.01)
*G01B 7/06* (2006.01)
(Continued)

(52) U.S. Cl.
CPC ..... *A01D 41/1271* (2013.01); *A01D 41/1276* (2013.01); *A01F 12/44* (2013.01);
(Continued)

(58) Field of Classification Search
CPC .. A01D 41/1271; A01D 41/1276; G01B 7/08; G01B 7/048
(Continued)

(56) References Cited

U.S. PATENT DOCUMENTS 5,134,379 A * 7/1992 Maher .................... G01V 3/088
324/663
5,529,537 A 6/1996 Johnson
(Continued)

FOREIGN PATENT DOCUMENTS

DE 4442711 A1 6/1996
JP H09257535 A 10/1997
(Continued)

*Primary Examiner* — John G Weiss
(74) *Attorney, Agent, or Firm* — Peter K. Zacharias; Patrick M. Sheldrake

(57) ABSTRACT

A sensor for measuring a thickness of a layer of a grain/residue mixture as the layer is transported through a cleaning arrangement of a combine harvester. The sensor is mounted on a support surface of a grain pan or a sieve of the cleaning arrangement and comprises a tower-shaped support structure with sensor elements attached to the structure and forming a vertical stack of sensor elements, so that a number of sensor elements is submerged in the layer and a number of sensor elements extends above the layer. The sensor elements are configured to measure an electrical property that changes as a function of immediate surroundings of the sensor elements. The sensor elements are configured to be read out independently from each other.

9 Claims, 4 Drawing Sheets

(51) Int. Cl.
*A01F 12/44* (2006.01)
*G01B 7/04* (2006.01)

(52) U.S. Cl.
CPC ............... *G01B 7/048* (2013.01); *G01B 7/08* (2013.01); *G01B 7/10* (2013.01)

(58) Field of Classification Search
USPC ....................................................... 56/10.2 R
See application file for complete search history.

(56) References Cited

U.S. PATENT DOCUMENTS

| | | | | |
|---|---|---|---|---|
| 5,708,369 | A * | 1/1998 | Horn | G01F 23/266 324/373 |
| 6,119,442 | A * | 9/2000 | Hale | A01D 41/127 56/10.2 H |
| 7,355,394 | B2 * | 4/2008 | Lei | G01B 7/105 324/226 |
| 8,282,453 | B1 | 10/2012 | Hillen et al. | |
| 9,526,211 | B2 * | 12/2016 | Murray | A01F 12/444 |
| 2006/0123757 | A1 * | 6/2006 | Baumgarten | A01D 41/127 56/10.2 R |
| 2013/0172057 | A1 | 7/2013 | Farley et al. | |
| 2015/0260501 | A1 * | 9/2015 | Go | B64D 15/20 324/671 |
| 2016/0198629 | A1 * | 7/2016 | Duquesne | A01D 41/1276 701/36 |
| 2016/0366821 | A1 * | 12/2016 | Good | A01D 41/1271 |

FOREIGN PATENT DOCUMENTS

| | | |
|---|---|---|
| JP | H10191767 A | 7/1998 |
| JP | H11155349 A | 6/1999 |
| JP | 2004267022 A | 9/2004 |
| JP | 2012205574 A | 10/2012 |

* cited by examiner

SENSOR ARRANGEMENT FOR COMBINE HARVESTER

CROSS REFERENCE TO RELATED APPLICATION

This application is the National Stage of International Application No. PCT/EP2015/061549 filed May 26, 2015, which claims priority to Belgian Application No. 2014/0402 filed May 26, 2014, the contents of which are incorporated herein by reference.

FIELD OF THE INVENTION

The present invention is related to agricultural harvesting vehicles, such as combine harvesters, for gathering and processing crop material from a field, in particular to a sensor and a sensor arrangement for monitoring crop throughput through the cleaning arrangement of a combine harvester.

STATE OF THE ART

Combine harvesters are equipped with threshing/separation means arranged for threshing crops and separating a mixture of grains and residue from the crops, and with a cleaning arrangement for further separating the grains from the residue. In many present day harvesters, the threshing and separation is done by a pair of longitudinally arranged threshing and separation rotors. The cleaning arrangement comprises preparation means, for example a reciprocating grain pan, configured to deliver the grain/residue mixture to a set of sieves which are equally moving in a reciprocating motion. Grains fall through the sieves, while residue is blown towards the rear of the machine by a blower or collected at the end of the sieves where it is evacuated from the harvester by a shredding and spreader arrangement. The cleaning arrangement is usually mounted underneath the threshing rotors, i.e. between the front wheels or tracks of the harvester.

Present day optimization of combine harvesters largely circles around maximizing the throughput without increasing the size of the vehicles as the latter is approaching a realistically workable limit. An important factor in optimizing the throughput is the adequate measurement of parameters of the crop treatment process, in order to use the measured values as inputs for various control loops applied in the harvester. One parameter that is of major importance is the thickness and structure of a layer of the grain/residue mixture as it is transported through the harvester's cleaning arrangement.

Due to the reciprocating motion of the grain pan and the difference in weight between the grains and the residue, the latter comprising mostly light chaff, dust and the like, a segregation takes place in the layer as the material advances towards the end of the grain pan. The heavier grains move to the bottom of the layer while the lighter residue moves to the top.

Monitoring devices have been described in the prior art for measuring parameters of the grain/residue mixture as it advances through the cleaning arrangement. Many of these devices are suitable only for a particular type of crop material. In document JPH09257535, a capacitive sensor is used for measuring the flow of grain on a grain pan. The sensor is mounted upright on the surface of a grain pan and comprises two comb-shaped electrodes engaged with each other and mounted parallel or perpendicular to the flow direction. Measurement of the electrostatic capacitance between the two electrodes allows the determination of the flow rate of a grain/residue mixture on the grain pan. This sensor is however unable to detect a grain layer and a residue layer being formed by segregation.

SUMMARY OF THE INVENTION

The present invention is related to a sensor, a sensor arrangement, an agricultural harvesting vehicle and a method as disclosed in the appended claims. The present invention is related generally to a sensor for measuring the thickness of a layer of a grain/residue mixture as the layer is transported through the cleaning arrangement of a combine harvester. The sensor is preferably mounted on the support surface of a grain pan or a sieve of the cleaning arrangement, which are subjected to a reciprocating movement for transporting the layer. The sensor comprises a tower-shaped support structure with sensor elements attached to the structure and forming a vertical stack of sensor elements, so that a number of sensor elements may be submerged in the advancing layer and a number of sensor elements extend above the layer. The sensor elements are configured to measure an electrical property that changes as a function of the immediate surroundings of the sensor element. The sensor elements are furthermore configured to be read out independently from each other. This feature makes the sensor capable of measuring not only the thickness of the layer itself but also the thickness of sub layers appearing when the layer becomes segregated, such as when a layer of grains is formed at the bottom and a layer of residue is formed at the top. The invention is equally related to a sensor arrangement comprising one or more sensors, to a combine harvester equipped with such a sensor arrangement, and to a method of measuring the layer thickness in such a combine harvester.

The sensor of the invention is designed to detect a change in the output values of the sensor elements mounted in the stack as a function of the sensor elements' position in the stack. This change is not dependent on the absolute values of the sensor output. For this reason, the sensor can be used regardless of the type of crop that is processed in the harvester. At the same time, the absolute values of the sensor elements can provide additional information, for example by cross-correlating them with known values for a given crop type at particular levels of humidity and/or temperature.

DETAILED DESCRIPTION OF PREFERRED EMBODIMENTS OF THE INVENTION

Figure 1:
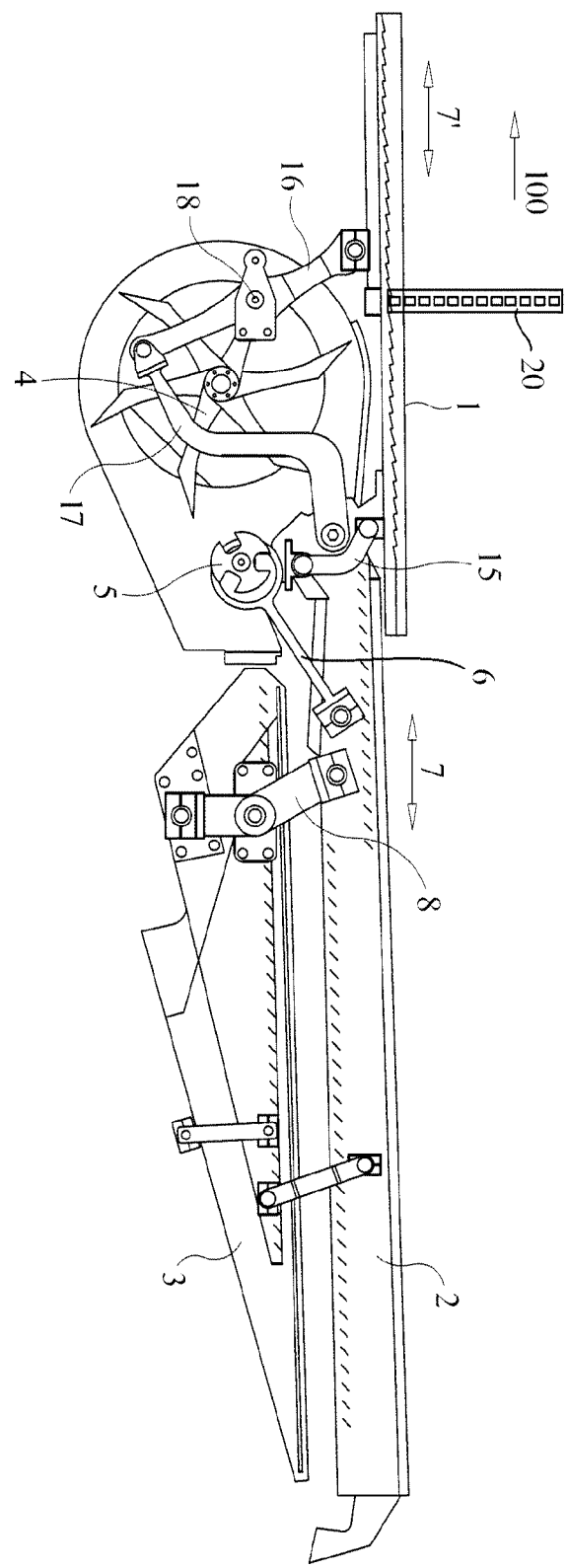
FIG. 1 shows a cleaning arrangement of a combine harvester equipped with a sensor according to the invention.

Preferred embodiments will now be described with reference to the drawings. The detailed description is not limiting the scope of the invention, which is defined only by the appended claims. FIG. 1 shows an image of a cleaning arrangement of a combine harvester, equipped with a sensor 20 according to the invention. The sensor is mounted on the surface of the grain pan 1 of the cleaning arrangement, onto which a layer of a grain/residue mixture may be transported. The sensor 20 is mounted so that the layer moves past and in contact with at least one side of the sensor, preferably at least along and in contact with both sides. The cleaning arrangement of FIG. 1 as such (without the sensor 20) is known in the art, and is only briefly summarized hereafter. The following components have been indicated by reference numerals: the grain pan 1, the upper and lower sieves 2 and 3, a blower 4 for blowing air through the sieves. The combine moves in the direction of arrow 100 during a harvesting run. A crankshaft 5 is driven by a suitable motor (not shown). Through the drive rod 6, the crankshaft drives a reciprocating movement of the upper sieve 2 indicated by the arrows 7, with respect to the harvester's chassis. Via connection 8, this reciprocating movement in turn drives a reciprocating movement of the lower sieve 3. The grain pan 1 is supported on each side by support arms 15 and 16. A drive arm 17 is pivotably connected to the upper sieve 2 and to the second support arm 16. The reciprocating movement of the upper sieve 2 drives the movement of the drive arm 17, which in turns actuates a swinging motion of the second support arm 16 about an axis 18. This swinging motion results in the reciprocating movement 7' of the grain pan 1, in anti-phase with the movement of the upper sieve 2. The movement 7' progressively moves a grain/residue layer towards the sieves 2/3.

Figure 2:
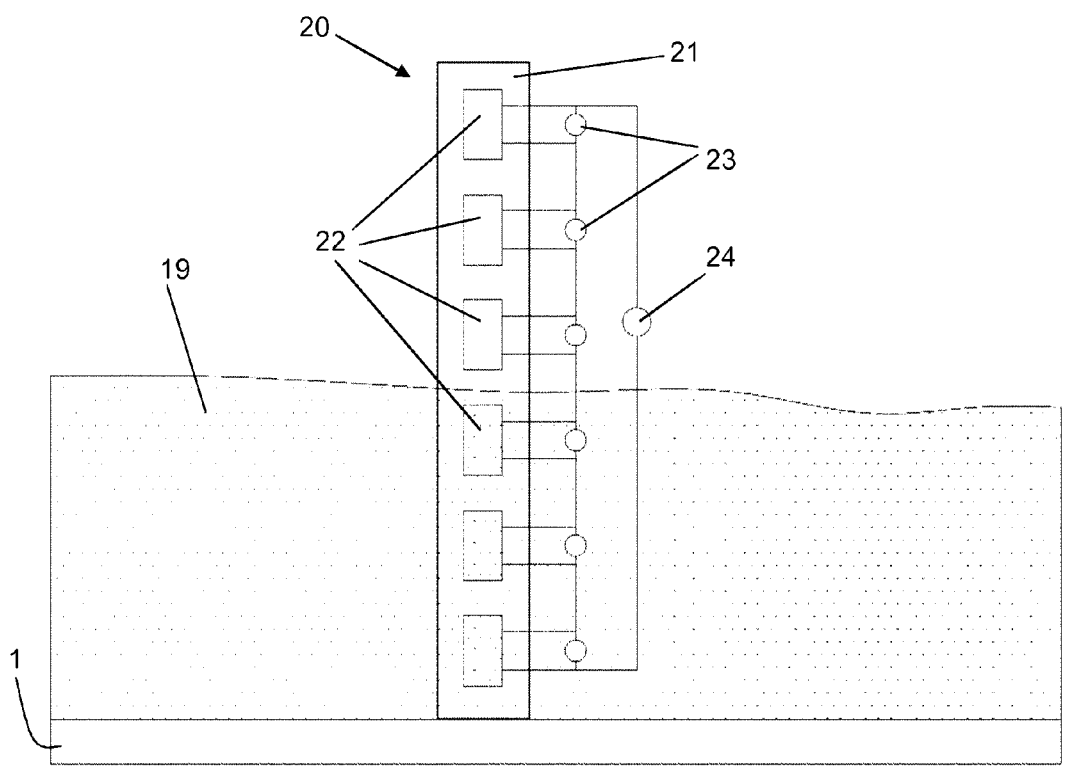
FIG. 2 shows a detailed view of a sensor according to the invention.

An enlarged view of the sensor 20 is shown in FIG. 2, which also shows the level of a layer 19 of a grain/residue mixture that is advancing on the grain pan 1. The sensor 20 comprises a vertical support structure 21, which is a tower-shaped structure, preferably in the form of a flat element such as a rigid rectangular strip or lathe, mounted upright on the surface of the grain pan 1, parallel to the direction of movement of the grain/residue layer. Multiple sensor elements 22 are attached to the support structure 21, and arranged in a vertical stack, i.e. one above the other and spaced apart by a preferably (but not necessarily) constant distance. Only six sensor elements 22 are shown in FIG. 2. However the amount of sensor elements is not defined, and may be determined on the basis of the type of sensor elements used, their size and the expected or allowable maximum layer thickness that is to be carried on the grain pan 1. For example, a sensor tower 20 with a height of about 20 cm comprising 12 regularly spaced sensor elements (i.e. spaced apart about 1.5 cm) is believed to be suitable for most purposes. According to an embodiment, the size of one sensor element 22 is about the size of one grain of the crop material that is processed in the harvester.

The sensor elements 22 are configured to measure an electrical property that changes as a function of the immediate surroundings of the sensor element. The sensor elements 22 are furthermore configured to be read out independently from each other. In other words, each sensor element 22 is connected to a separate read-out means 23. The sensor elements may be powered by a single power source 24 as shown in the embodiment of FIG. 2 or by separate power sources (one for each sensor element for example). The read-out means 23 and power source 24 are shown schematically in FIG. 2 to illustrate their connectivity with respect to the sensor elements 22, and must not be interpreted as being necessarily a part of the sensor 20. The power means could however be incorporated in the sensor (e.g. a battery). The read-out means 23 must be understood to include a means for measuring the electrical property (which may or may not be incorporated in the sensor) and a means for interfacing the measurement means with an operator, for showing the result of the measurement and allowing the operator to change settings. The interfacing means may typically be present in the combine driver's cabin. In practice, the read-out and power means can be realized according to any appropriate sensor technology known in the art. Wiring from the sensor elements 22 to the power source(s) and read-out means are preferably incorporated in the vertical support structure 21 which may comprise an interface for connecting said wiring to suitable power and read-out devices situated in or operable from the driver's cabin of the combine.

The sensor elements 22 are capable of distinguishing between a first condition where the sensor is in contact with air and a second condition where the sensor is in contact with a layer of a grain/residue mixture. As the sensor elements are configured to be read out independently from each other, they are equally capable of distinguishing between multiple layers in a segregated layer of the grain/residue mixture, provided that the sensor elements have the appropriate sensitivity required for making that distinction. For example, when capacitive sensor elements are used, the elements must be capable of detecting a identifiable change in the capacity when the sensor is in contact with a layer of grain compared to when the sensor is in contact with a layer of residue.

Besides capacitive sensors, other types of sensors may be used as the sensor elements 22, such as for example eddy current sensors. Existing types of commercially available sensors may be used where appropriate. Capacitive sensor elements 22 that are suitable for use in a sensor 20 of the invention are for example cylindrical sensor types CS005 or CS02 from Micro-Epsilon. When cylindrical sensor elements are used, they are preferably mounted with their longitudinal axis parallel to the direction of movement of the grain/residue layer, i.e. perpendicular to the stack of sensor elements 22. Because cylindrical sensor elements may form a larger obstruction to the advancing layer, a preference goes out to flat sensor elements, such as the CSG02FL-CRm1,4 from Micro-Epsilon. Flat sensor elements are mounted with their flat side attached to the support structure 21 so as to form less of an obstruction for the advancing layer. The sensor elements, be it cylindrical, flat or otherwise, may also be incorporated in the thickness of the support structure 21, e.g. in a support structure provided with cavities into which the cylindrical or flat sensor elements are fitted. According to a preferred embodiment, the vertical support 21 consists of or comprises a PCB board that incorporates the sensor elements 22 as well as the conductors that connect the sensor elements to the read-out and power means 23/24. In the case of flat sensor elements especially, this provides a way of producing a thin vertical sensor tower with perfectly flat sidewalls which therefore represents a minimum obstruction for the grain/residue layer 19 as it moves through the combine's cleaning arrangement.

Figure 3:
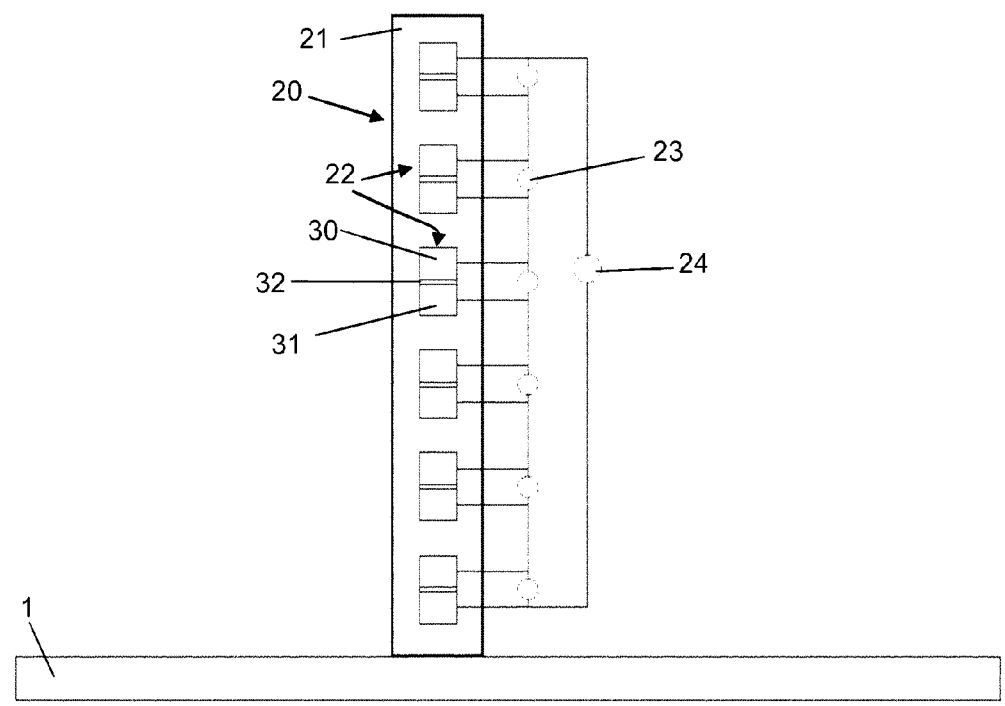
FIG. 3 shows an embodiment of a sensor according to the invention provided with capacitive sensor elements that have a large contact area with the passing grain/residue layer.

FIG. 3 shows a preferred embodiment of a sensor 20 wherein the sensor elements 22 are capacitive sensors, comprising a planar upper electrically conductive plate 30, a planar lower electrically conductive plate 31 and a dielectric element 32 in between and in contact with the two plates, the plates being mounted in the same vertical plane when the sensor is placed on a horizontal surface 1. In other words, the plates 30/31 are perpendicular to the grain pan 1 and parallel to the movement direction of the grain/residue layer. When the support structure 21 is a flat strip or lathe, as in the case of FIG. 3, the conductor plates 30/31 are parallel to the support structure. The dielectric element 32 is preferably also flat and has the same thickness as the plates 30/31 (in the direction perpendicular to the drawings). The plates are connected to read-out means 23 configured to measure the capacity between the plates 30/31 and to a power source 24 configured to create a voltage difference between the plates 30/31. The plates 30/31 could also be mounted side-by-side instead of one above the other with the dielectric element 32 oriented vertically instead of horizontally. The planar design of the sensor elements 22 according to this embodiment ensures a large contact area with the moving grain/residue mixture which leads to a higher sensitivity of the sensor elements as well as a more stable output value. Sensor elements 22 according to this embodiment are preferably incorporated in a PCB board, along with the required wiring connecting the plates 30/31 to the power and read-out means 24/23.

Figure 4A:
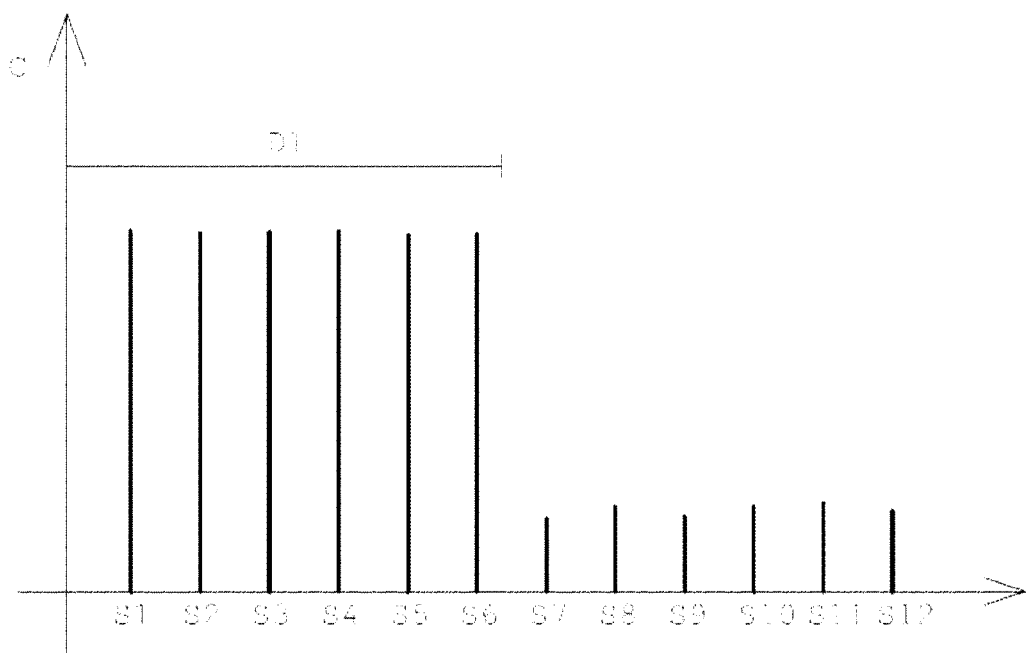
FIG. 4 shows examples of output values obtained from a sensor according to the invention, and how these values correlate to the thickness of the grain/residue layer and of sub layers thereof in the case of a segregated layer.

FIG. 4a shows a typical output from a sensor 20 according to the invention when a uniform grain/residue layer passes by the sensor, i.e. a layer wherein no segregation has taken place. The sensor is provided with 12 sensor elements S1 to S12. The vertical axis shows the electrical property that is read out by the read-out means 23, e.g. a capacity C. The horizontal axis shows the positions of the sensor elements along the height of the support structure 21. The thickness D1 of the grain/residue layer can be estimated as the middle position between sensor elements S6 and S7 between which the sensor output changes from a given approximately constant value, corresponding to the capacity when the sensor elements are in contact with the layer to a lower value corresponding to the capacity when the sensor elements are in contact with air.

Figure 4B:
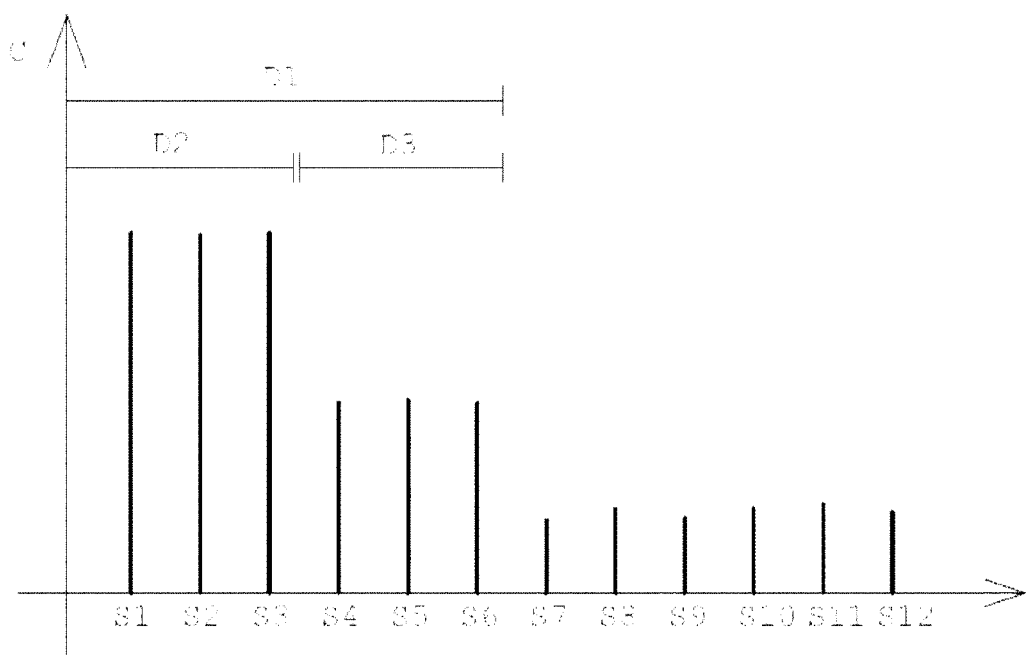

FIG. 4b shows an output from the same sensor for a fully segregated layer of the same thickness D1. The sensors S1 to S3 that are buried in the grain layer detect a larger capacity than the sensors S4 to S6 buried in the residue layer. The detection of this change in output values allows to make an estimation of the thickness D2 of the grain layer and of the thickness D3 of the residue layer. This distinction between grain and residue is a direct consequence of the sensor elements S1 to S12 being readable independently from each other.

Apart from detecting the actual values of D2 and D3, the sensor of the invention may be used for estimating the moment when segregation begins to appear, for example as a function of the speed of the reciprocating movement of the grain pan. This allows a better monitoring of the cleaning process.

When the segregation is not yet fully completed, the detected profile will show an additional level compared to the profile shown in FIG. 4b for a fully segregated layer. There will first be a layer of grain forming at the bottom, then a mixed layer and on top of that a layer of residue. The higher the number of sensor elements on the sensor 20, the sooner the start of the segregation will be detected.

Figure 5:
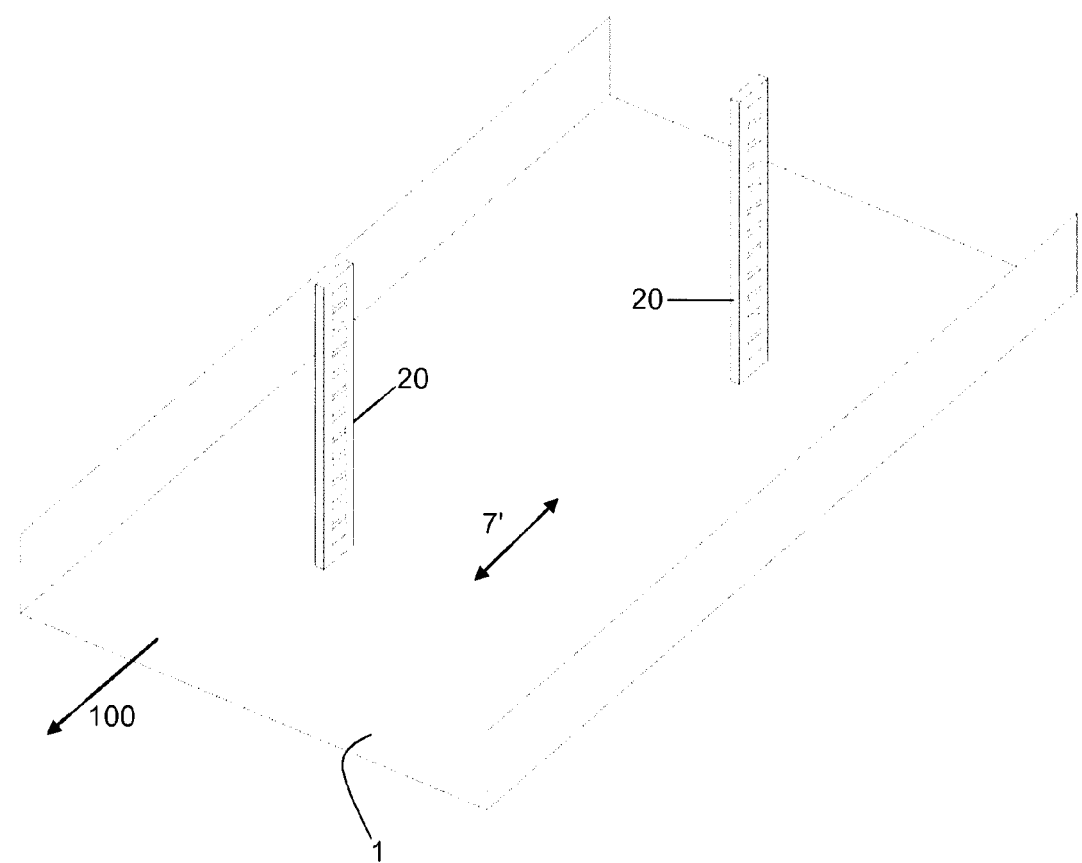
FIG. 5 illustrates an example of a sensor arrangement comprising multiple sensors according to the invention.

The invention is related to a sensor as shown in FIGS. 1 to 3, i.e. the support structure 21 with sensor elements 22 attached to it in a vertical stack. The invention is equally related to a sensor arrangement wherein one or more sensors 20 are mounted on the grain pan(s) and/or the sieve(s) or other moving or non-moving portions of a cleaning arrangement in order to measure the thickness and if applicable the segregation in an advancing layer at various locations. The sensor arrangement comprises the sensors as such as well as the read-out means 23 to which the individual sensor elements 22 of the sensors are connected. FIG. 5 shows an example of a grain pan 1 arranged to move a grain/residue layer in a direction 101 by a reciprocating movement 7'. The grain pan is equipped with a sensor arrangement comprising two sensors 20 according to the invention, one sensor being located more upstream than the other, one sensor being placed more to the left of the pan's centre line, the other more to the right.

In a cleaning arrangement according to the invention, the sensor 20 may be mounted in any suitable portion of the cleaning arrangement, not only on the grain pan 1 or the sieves 2/3, but also on other locations such as on clean grain sheet areas (not shown in FIG. 1). The sensor 20 may be placed on moving parts (such as grain pain and sieves) or on non-moving parts (e.g. on side sheets of the cleaning arrangement). The sensor 20 may be mounted directly on a grain carrying surface of the cleaning arrangement, i.e. attached to the surface onto which the layer is supported as shown in FIGS. 1 and 5. The sensor could also be mounted on other suitable locations, for example on a sidewall of the grain pan or on a divider, i.e. a separating wall of the grain pan for separating the grain/residue layer into two parallel streams. In general, the sensor 20 is configured to be mounted in the cleaning arrangement so that at least a portion of the stack of sensor elements 22 may be buried in or in close proximity to a grain/residue layer. The term 'close proximity' means that the distance between the sensor elements and the layer is small enough so that the influence of the layer on the electrical property measured by the sensor elements can be detected. The sensor elements need not be in physical contact with the layer. For example a protective screen could be placed around the sensor at a distance small enough to allow the detection of the layer and measurement of the layer thickness and segregation as described above.

The invention is also related to an agricultural harvesting vehicle, in particular a combine harvester, equipped with a sensor 20 or a sensor arrangement according to the invention.

The invention is equally related to methods for measuring the layer thickness in a harvesting vehicle using one or more sensors according to the invention. The sensor(s) can be read out continuously, or at fixed read-out times with pre-defined, possibly fixed intervals between subsequent read-out times. According to a preferred embodiment, the read-out time is configured to coincide with a given point in the movement cycle of the grain pan. In the cleaning arrangement of FIG. 1, the grain pan undergoes a reciprocating movement which is however not linear but rather has the grain pan's support points at the ends of support arms 15 and 16 moving back and forth along an arc, i.e. the grain pan moves back and forth and also up and down. In conjunction with this cycle, the output of the sensor(s) 20 may for example be measured only when the grain pan is at its lowest point, at which point in time the layer has the highest density. By measuring the thickness only at this point of the cycle, measurements are more comparable. In the configuration of FIG. 1, a synchronization may therefore be established between the reading out of the sensor elements 22 and the moment when the drive shaft's position corresponds to the lowest point of the pan 1. A detector for detecting the drive shaft position may be used in conjunction with the sensor(s) 20 of the invention for realizing the synchronized operation.

Alternatively, the grain pan or other moving parts moving in conjunction with the pan may be provided with accelerometers which detect the moment at which the pan is at its lowest point by detecting a maximum in inertia-generated tensions in the pan or one of said moving parts, such as the support arms 15/16 supporting the pan 1 in the configuration of FIG. 1. The reading out of the sensor elements may then be synchronized with these moments detected by the accelerometers.

The invention claimed is:

1. A method for measuring a thickness of a layer of a grain/residue mixture in a cleaning arrangement of an agricultural harvesting vehicle comprising a cleaning arrangement and a sensor arrangement for measuring a thickness of a layer of a grain/residue mixture in the agricultural harvesting vehicle, the sensor arrangement comprising one or more sensors, each comprising a support structure and a plurality of sensor elements mounted as a stack of sensor elements on the support structure, wherein the one or more sensors are mounted in the cleaning arrangement so that at least a portion of the stack of sensor elements of each of the one or more sensors may be buried in or in close proximity to the layer of the grain/residue mixture, and wherein the sensor elements of each of the one or more sensors are configured to measure an electrical property that changes as a function of immediate surroundings of the sensor elements; the sensor arrangement further comprising read-out means for reading out the sensor elements of each of the one or more sensors independently from each other, the method comprising steps of:

transporting the layer of the grain/residue mixture on a support surface of the cleaning arrangement, past one of the one or more sensors, measuring outputs of the sensor elements provided in the one or more sensors, detecting one or more changes in values of the outputs of the sensor elements of the one or more sensors as a function of their position in the stack of sensor elements provided in each of the one or more sensors, and estimating a thickness of the layer at a location of each of the one or more sensors, by estimating positions of the detected one or more changes, wherein the step of detecting comprises detecting multiple changes, indicating an appearance of a segregated layer, and wherein a thicknesses of sub layers of the layer of the grain/residue mixture is estimated from estimated positions of the multiple changes.

2. The method according to claim 1, wherein the measuring step is synchronised with a reciprocating movement of a component of the cleaning arrangement onto which the one or more sensors are mounted.

3. The method according to claim 2, wherein the measuring step is performed when a density of the layer is at a maximum and wherein the moment at which the density of the layer is at a maximum is detected by one or more accelerometers mounted on moving components of the cleaning arrangement.

4. A method for measuring a thickness of a layer of a grain/residue mixture in a cleaning arrangement of an agricultural harvesting vehicle comprising a cleaning arrangement and a sensor arrangement for measuring a thickness of a layer of a grain/residue mixture in the agricultural harvesting vehicle, the sensor arrangement comprising one or more sensors, each comprising a support structure and a plurality of sensor elements mounted as a stack of sensor elements on the support structure, wherein the one or more sensors are mounted in the cleaning arrangement so that at least a portion of the stack of sensor elements of each of the one or more sensors may be buried in or in close proximity to the layer of the grain/residue mixture, and wherein the sensor elements of each of the one or more sensors are configured to measure an electrical property that changes as a function of immediate surroundings of the sensor elements; the sensor arrangement further comprising read-out means for reading out the sensor elements of each of the one or more sensors independently from each other, the method comprising steps of:

transporting the layer of the grain/residue mixture on a support surface of the cleaning arrangement, past one of the one or more sensors, measuring outputs of the sensor elements provided in the one or more sensors, detecting one or more changes in values of the outputs of the sensor elements of the one or more sensors as a function of their position in the stack of sensor elements provided in each of the one or more sensors, and estimating a thickness of the layer at a location of each of the one or more sensors, by estimating positions of the detected one or more changes, wherein the measuring step is synchronised with a reciprocating movement of a component of the cleaning arrangement onto which the one or more sensors are mounted.

5. The method according to claim 4, wherein the step of detecting comprises detecting multiple changes, indicating an appearance of a segregated layer, and wherein a thicknesses of sub layers of the layer of the grain/residue mixture is estimated from estimated positions of the multiple changes.

6. The method according to claim 4, wherein the measuring step is performed when a density of the layer is at a maximum and wherein the moment at which the density of the layer is at a maximum is detected by one or more accelerometers mounted on moving components of the cleaning arrangement.

7. A method for measuring a thickness of a layer of a grain/residue mixture in a cleaning arrangement of an agricultural harvesting vehicle comprising a cleaning arrangement and a sensor arrangement for measuring a thickness of a layer of a grain/residue mixture in the agricultural harvesting vehicle, the sensor arrangement comprising one or more sensors, each comprising a support structure and a plurality of sensor elements mounted as a stack of sensor elements on the support structure, wherein the one or more sensors are mounted in the cleaning arrangement so that at least a portion of the stack of sensor elements of each of the one or more sensors may be buried in or in close proximity to the layer of the grain/residue mixture, and wherein the sensor elements of each of the one or more sensors are configured to measure an electrical property that changes as a function of immediate surroundings of the sensor elements; the sensor arrangement further comprising read-out means for reading out the sensor elements of each of the one or more sensors independently from each other, the method comprising steps of:

transporting the layer of the grain/residue mixture on a support surface of the cleaning arrangement, past one of the one or more sensors, measuring outputs of the sensor elements provided in the one or more sensors, detecting multiple changes in values of the outputs of the sensor elements of the one or more sensors as a function of their position in the stack of sensor elements of each of the one or more sensors, the multiple changes indicating an appearance of a segregated layer, and estimating thicknesses of sub layers of the layer from estimated positions of the multiple changes.

8. The method according to claim 7, wherein the measuring step is synchronised with a reciprocating movement of a component of the cleaning arrangement onto which the one or more sensors are mounted.

9. The method according to claim 7, wherein the measuring step is performed when a density of the layer is at a maximum and wherein the moment at which the density of the layer is at a maximum is detected by one or more accelerometers mounted on moving components of the cleaning arrangement.

* * * * *